(12) United States Patent
Burek et al.

(10) Patent No.: US 10,162,143 B1
(45) Date of Patent: Dec. 25, 2018

(54) BEHIND-THE-WALL FIBER SPOOL MODULE

(71) Applicant: OFS Fitel, LLC, Norcross, GA (US)

(72) Inventors: Denis E Burek, Cumming, GA (US);
Xavier Chiron, Atlanta, GA (US);
Lynda Price, Oakwood, GA (US);
Willard C White, Suwanee, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/935,250

(22) Filed: Mar. 26, 2018

Related U.S. Application Data

(60) Provisional application No. 62/568,535, filed on Oct. 5, 2017, provisional application No. 62/561,352, filed on Sep. 21, 2017.

(51) Int. Cl.
| | | |
|---|---|---|
| *G02B 6/44* | (2006.01) | |
| *H01R 13/73* | (2006.01) | |
| *H02G 3/12* | (2006.01) | |

(52) U.S. Cl.
CPC ......... *G02B 6/4466* (2013.01); *G02B 6/4441* (2013.01); *G02B 6/4453* (2013.01); *G02B 6/4457* (2013.01); *H01R 13/73* (2013.01); *H02G 3/12* (2013.01); *G02B 6/4452* (2013.01); *G02B 6/4463* (2013.01)

(58) Field of Classification Search
CPC .................................................. G02B 6/4466
See application file for complete search history.

(56) References Cited

U.S. PATENT DOCUMENTS

| | | | | |
|---|---|---|---|---|
| 5,189,256 A | * | 2/1993 | Epple | G02B 6/4466 174/50 |
| 5,638,481 A | * | 6/1997 | Arnett | G02B 6/3817 385/135 |
| 5,659,650 A | * | 8/1997 | Arnett | G02B 6/3817 385/135 |
| 5,761,368 A | | 6/1998 | Arnett et al. | |
| 6,243,526 B1 | * | 6/2001 | Garibay | G02B 6/3887 385/135 |
| 6,612,515 B1 | * | 9/2003 | Tinucci | B65H 49/38 206/397 |
| 7,542,649 B1 | * | 6/2009 | Andersen | G02B 6/4453 385/135 |
| 8,818,157 B2 | | 8/2014 | Burek et al. | |
| 9,638,882 B2 | * | 5/2017 | Smith | G02B 6/4457 |

(Continued)

*Primary Examiner* — Jerry Rahll
(74) *Attorney, Agent, or Firm* — Law Office of Leo Zucker

(57) ABSTRACT

A module for storing optical fiber at user premises. A fiber supply spool has at least one winding section for storing a length of fiber to be routed at the premises. A spool plate has a base with retaining fingers for mounting the supply spool for rotation, and a hinge pin supported between the ends of two arms extending from the base. An elongated adapter plate is arranged for fastening over an opening cut in a drywall at the premises. The adapter plate includes at least one hinge mount for seating the hinge pin on the spool plate for swiveling movement. The spool plate can swivel on the adapter plate together with the mounted spool between a position where fiber is unwound from the spool for routing at the premises, and a position where the spool with remaining fiber is passed through the opening to be stored behind the drywall.

15 Claims, 7 Drawing Sheets

(56) References Cited

U.S. PATENT DOCUMENTS

| | | | | |
|---|---|---|---|---|
| 2005/0213920 | A1* | 9/2005 | Tanaka | G02B 6/4466 |
| | | | | 385/135 |
| 2005/0220435 | A1* | 10/2005 | Tanaka | G02B 6/3897 |
| | | | | 385/134 |
| 2008/0292261 | A1* | 11/2008 | Kowalczyk | G02B 6/3897 |
| | | | | 385/135 |
| 2013/0287358 | A1* | 10/2013 | Alston | G02B 6/4441 |
| | | | | 385/135 |
| 2014/0161411 | A1* | 6/2014 | Slater | G02B 6/4457 |
| | | | | 385/135 |

* cited by examiner

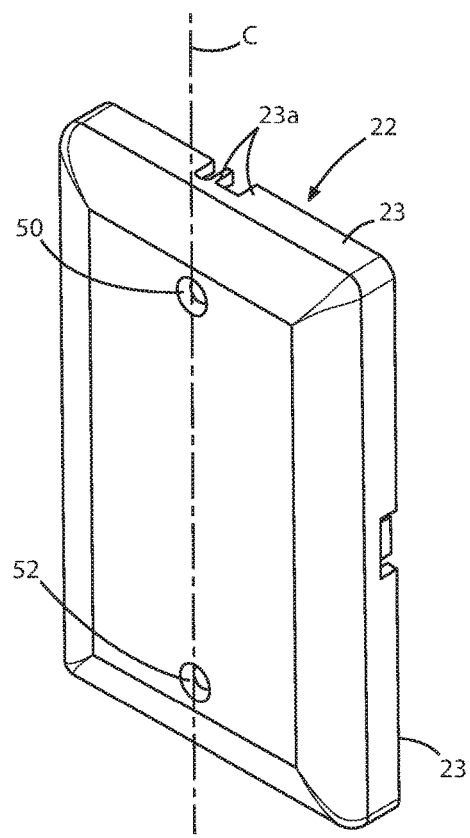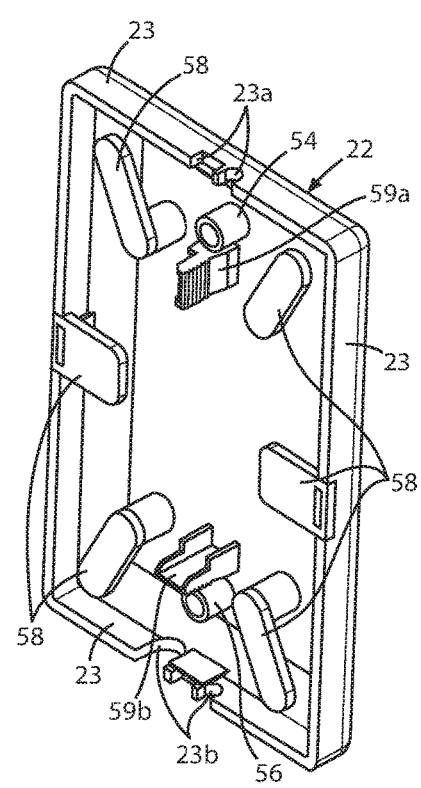
*FIG. 5A*  *FIG. 5B*

BEHIND-THE-WALL FIBER SPOOL MODULE

CROSS REFERENCE TO RELATED APPLICATIONS

This application claims priority under 35 U.S.C. § 119(e) of U.S. Provisional Patent Applications No. 62/561,352 filed Sep. 21, 2017, and No. 62/568,535 filed Oct. 5, 2017. both of which are incorporated by reference in their entireties.

BACKGROUND OF THE INVENTION

Field of the Invention

The present invention relates to modules for storing optical fibers inside the premises of fiber optic network users.

Discussion of the Known Art

During a typical fiber-to-the-home (FTTH) installation at the premises of a fiber optic network user, a drop fiber is routed over a path that is hidden as much as possible from view by occupants of the premises. For example, the fiber may be stapled or bonded with an adhesive to a crown molding near the ceiling and/or to a baseboard near the floor. The path extends between an entry point at the premises where the fiber is connected at one end to a provider network terminal, and at the other end to a module that is mounted on a wall inside the premises. Any remaining or "slack" length of fiber is stored inside the module, and on the same spool from which the fiber was initially supplied and unwound when routed at the premises.

The end of the of the fiber stored on the spool is terminated in a connector, and the connector is mated to one side of a connector adapter that is also stored inside the module. The other side of the adapter is exposed to the outside, and a fiber jumper cable is connected at one end to the adapter. The other end of the jumper cable is typically connected to an optical network terminal (ONT) that may be placed on a desk or shelf at the premises. U.S. patent application Ser. No. 15/712,754 filed Sep. 22, 2017, and assigned to the present assignee, discloses a fiber storage module that can be mounted on a wall or placed on a shelf at user premises. See also U.S. Pat. No. 8,818,157 (Aug. 26, 2014), which is incorporated by reference.

The ONT operates to convert downlink optical signals originating from the network provider and transmitted from the network terminal through the drop fiber and the jumper cable, into corresponding electrical signals that are provided at an output of the ONT. A wire cable is connected at one end to the ONT output, and at the other end to, e.g., a television and/or a router that is configured to link other electronic devices at the premises with the fiber optic network. The ONT also converts electrical signals that originate from the devices into corresponding uplink optical signals that it sends to the network terminal through the jumper cable and the drop fiber, for transmission to the network provider.

Although a typical FTTH installation as described above operates well and is widely deployed, installers have expressed a desire to be able to finish the installation without the wall mounted module. Customers would also prefer to eliminate the module so that when finished, the installation will not have an adverse visual impact on premises occupants.

U.S. Pat. No. 6,243,526 (Jun. 5, 2001) and U.S. Pat. No. 5,761,368 (Jun. 2, 1998) relate to storage spool assemblies for optical fiber. Slack lengths of optical fibers that are routed behind a wall at user premises, are stored on spools that are fixed behind a faceplate mounted on the front of the wall. The fibers are coupled to connectors that are accessible on the front of the faceplate. The spools are not accessible for storing excess lengths of fibers that are routed along exposed surfaces of walls or wall moldings at the premises, however. Accordingly, there is a need for a fiber storage module for storing a slack length of fiber after the fiber is routed along a wall or other exposed surface at user premises, and for enabling the fiber to be connected to optical devices at the premises, wherein the module is out of the ordinary field of view of occupants at the premises.

SUMMARY OF THE INVENTION

According to the invention, a module for storing a length of optical fiber at user premises, includes a fiber supply spool having a hollow cylindrical hub, a first set of fiber retaining ears extending radially outward from a top axial end of the hub, and a second set of fiber retaining ears extending radially outward from a bottom axial end of the hub. The two sets of retaining ears form at least one winding section on the spool for storing a length of optical fiber for routing at the premises.

A spool plate has a base, and a number of spool retaining fingers that extend upward from the base to engage the hub of the supply spool so that spool can rotate about the retaining fingers when the spool hub is centered over the retaining fingers and urged a certain distance toward the base of the spool plate. The spool plate also has a hinge pin portion including arms that extend from the base, and a hinge pin is supported between distal ends of the arms.

An elongated adapter plate is formed and arranged for fastening to a drywall at the premises. The adapter plate includes at least one hinge mount for seating the hinge pin on the spool plate. Thus, the spool plate with the mounted spool can swivel with respect to the adapter plate between a position where an optical fiber supplied on the spool is unwound for routing over a desired path at the premises, and a position where the spool plate and the mounted spool are passed through an opening in a drywall at the premises and the adapter plate is fastened over the opening so that the spool is stored behind the drywall with a length of fiber remaining on the spool after routing at the premises.

For a better understanding of the invention, reference is made to the following description taken in conjunction with the accompanying drawing and the appended claims.

BRIEF DESCRIPTION OF THE DRAWING FIGURES

In the drawing:

FIG. 5A is a view of a cover for the inventive modules in FIGS. 1 and 2, as seen from the front;

FIG. 5B is a view of the cover in FIG. 5A as seen from the rear;

DETAILED DESCRIPTION OF THE INVENTION

Figure 1:
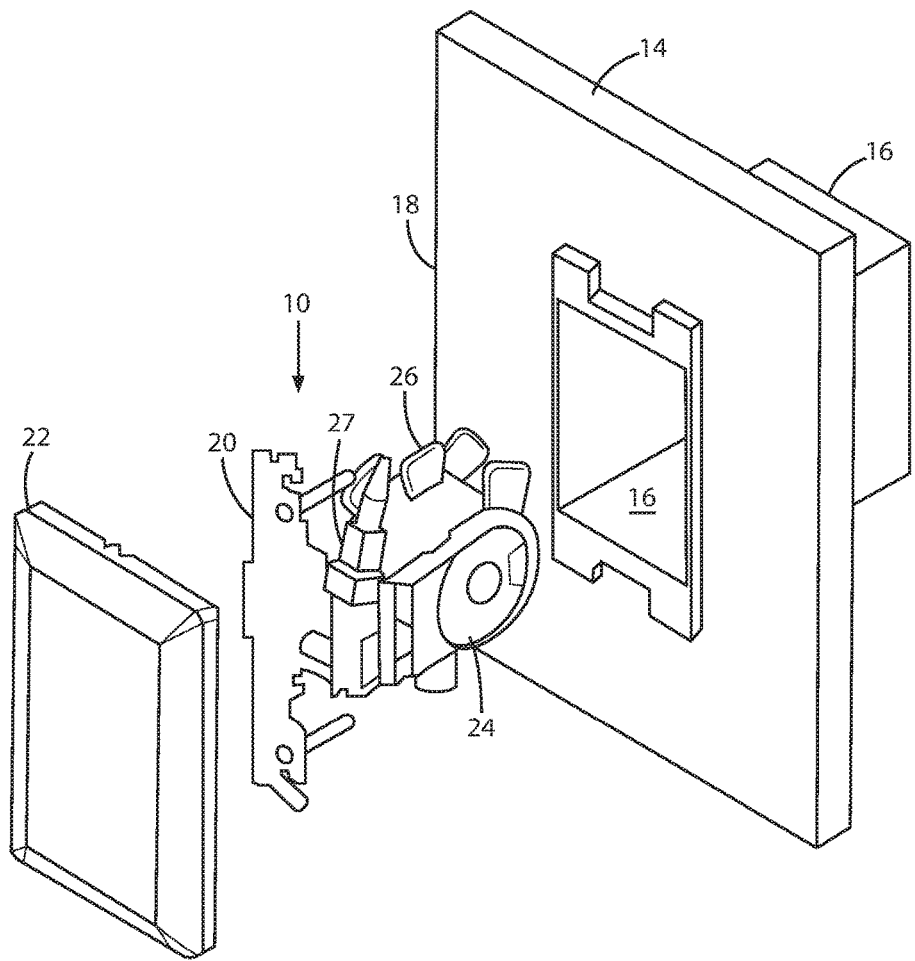
FIG. 1 is an assembly view of a first embodiment of a fiber spool module according to the invention.
Figure 2:
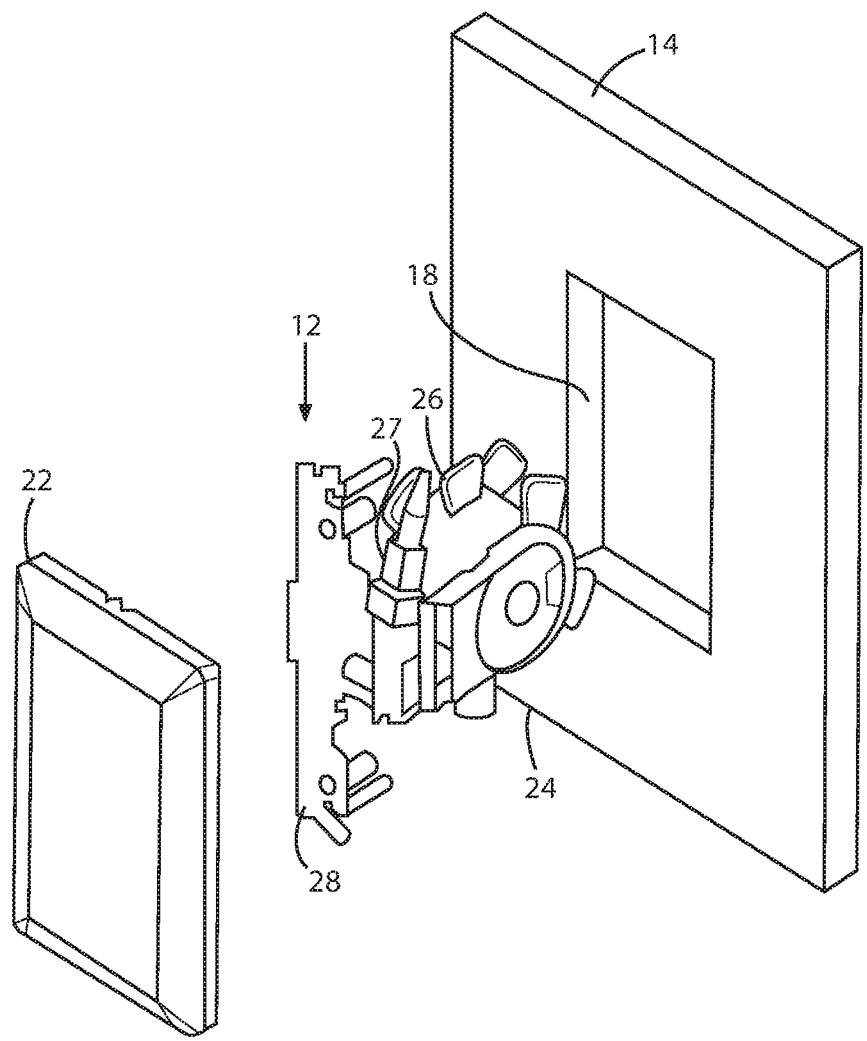
FIG. 2 is an assembly view of a second embodiment of a fiber spool module according to the invention.

FIG. 1 shows a first embodiment of a fiber spool module 10 according to the invention, and FIG. 2 shows a second embodiment of a fiber spool module 12 according to the invention. Both of the modules 10, 12 are constructed and arranged for installation behind a drywall 14 at the premises of a fiber optic network user, so that the installed modules will have little if any adverse visual impact on occupants of the premises.

Unless otherwise stated, all dimensions and angles stated herein with respect to components of the modules 10, 12, are approximate and only exemplary, and are not intended to limit the scope of the present invention.

Module 10 is constructed to be housed inside a standard utility box 16 that extends behind the drywall 14. The box 16 fits snugly within a rectangular opening 18 that is cut in the drywall 14 and measures, e.g., 3.50 inches by 2.00 inches. The module 12 is dimensioned and arranged to pass through the opening 18 and to extend behind the drywall 14 without the utility box 16.

The module 10 includes an adapter plate 20, a cover 22, a spool plate 24 that hinges on the adapter plate 24, a spool 26 configured to mount on the spool plate 24, and a connector adapter 27 (e.g., type SCA) that is supported on the adapter plate 20. Note that type SCA connectors are dimensionally the same as SC connectors, but with an angled end face that introduces lower loss when mated with another SCA connector.

Module 12 includes the cover 22, the spool plate 24, the spool 26, the connector adapter 27, and a different adapter plate 28. As viewed in FIGS. 1 and 2, the adapter plates 20, 28 are oriented for insertion through the opening 18 in the drywall 14, after the plates 20, 28 are assembled with the spool plate 24, the spool 26, the adapter 27, and a length of slack fiber on the spool 26 is terminated, as described below.

Figure 3:
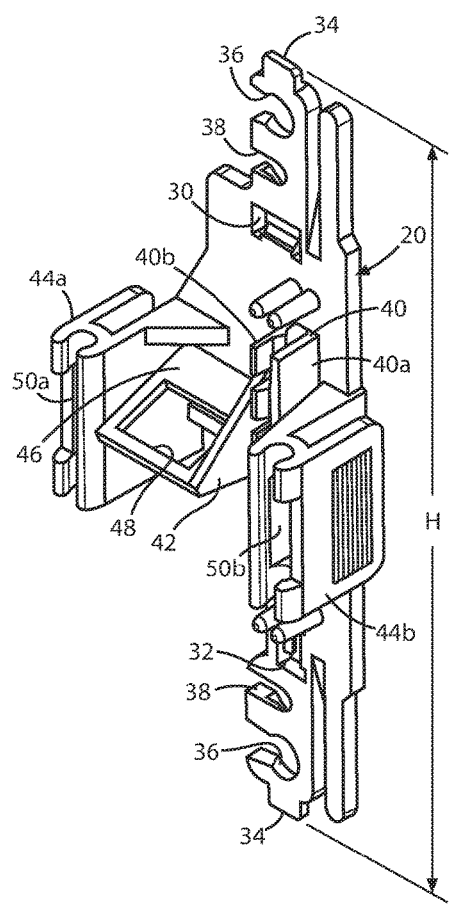
FIG. 3 is an enlarged view of an adapter plate in FIG. 1.

FIG. 3 is an enlarged view of the adapter plate 20. The plate 20 is generally elongated and may be formed of a clear ABS/PC blend, or equivalent material that is RoHS compliant. The adapter plate 20 has a pair of keyed slots 30, 32 that are formed to receive and capture corresponding tabs 59a, 59b that project from the inside surface of the cover 22 (see FIG. 5B), so that the cover 22 can be snapped in place over the adapter plate 20 when the plate is secured across the opening 18 in the drywall 14. In addition to supporting the adapter 27, the adapter plate 20 is configured to accept two 40 mm long splice sleeves, and to allow a slack length of fiber (e.g., 900 μm O.D.) wound on the spool 26 to exit from a top or bottom edge of the cover 22 when the adapter plate 20 is fastened to the drywall 14, and the cover 22 is fixed over the adapter plate 20 and the opening 18 in the drywall.

Specifically, the adapter plate 20 may have an overall height H of, e.g., 4.706 inches, including short tabs 34 that project from the top and the bottom ends of the plate as viewed in FIG. 3. The tabs 34 are seated in corresponding cutouts in the top and the bottom edges of the cover 22 when the cover is fixed over the adapter plate 20.

A first pair of open ended slots 36 are formed near the top and the bottom ends of the adapter plate 20. The slots 36 are spaced apart by, e.g., 4.030 inches so that the adapter plate 20 can be fastened by screws to the drywall 14 above and below the wall opening 18.

A second pair of open ended slots 38 are also formed along the length of the adapter plate 20, wherein the slots 38 are spaced, e.g., 3.300 inches apart. The cover 22 can therefore be fastened directly to the utility box 16 by inserting two screws through openings formed in the cover 22 (see FIG. 5), passing the screws through the slots 38 in the adapter plate 20, and threading the screws into corresponding openings formed in the utility box 16.

An elongated splice holder 40 is formed midway along the length of the adapter plate 20, for receiving and storing two 40 mm splice sleeves. The holder 40 is formed by a continuous flat vertical wall 40a that is approximately 1.548 inches long and 0.293 inch high, and a series of six evenly spaced retaining fingers 40b that are arrayed parallel to the wall 40a and spaced approximately 0.106 inch from the wall.

An adapter mounting frame 42 is also formed midway along the length of the adapter plate 20 and next to the splice holder 40, for securing the connector adapter 27 as shown in FIGS. 1 and 2. The frame 42 is formed, e.g., by a 0.699 inch wall 46 that extends from the base of the plate 20 at an angle of 110 degrees with respect to the base. A rectangular aperture 48 is formed in the wall 46 for receiving the adapter 27, wherein the aperture 48 is dimensioned so that the wall 46 secures the adapter firmly at the desired orientation.

Two spool plate hinge mounts 44a, 44b are also formed midway along the length of the adapter plate 20, and at either side of the plate. Each one of the mounts 44a, 44b forms an elongated hinge knuckle 50a, 50b, wherein the axis of each knuckle is approximately 0.600 inch above the base of the plate 20.

Figure 4:
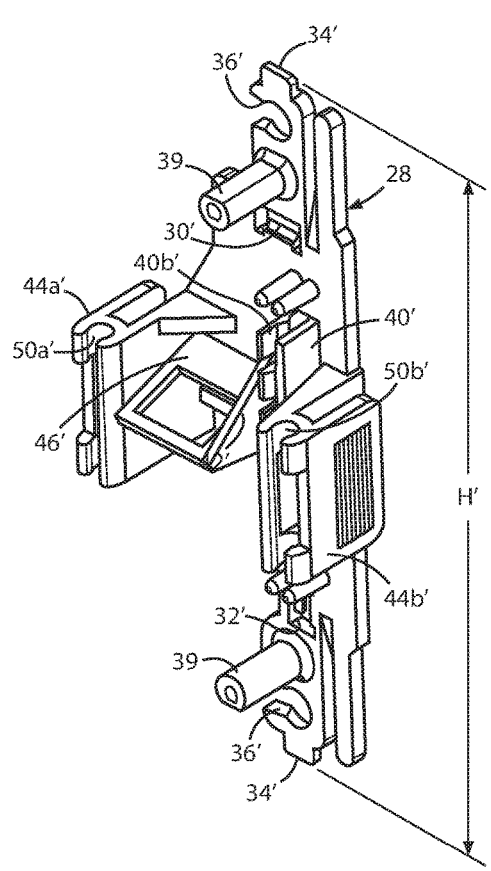
FIG. 4 is an enlarged view of an adapter plate in FIG. 2.

FIG. 4 is an enlarged view of the adapter plate 28. Parts or features of the adapter plate 28 that are same as corresponding parts of the adapter plate 20 are identified using the same reference numerals with an apostrophe. Like the adapter plate 20, the adapter plate 28 is generally elongated and includes the tabs 34' at the top and the bottom ends of the plate 28.

A first pair of open ended slots 36' are formed near the top and the bottom ends of the adapter plate 28. The slots 36' are spaced apart by, e.g., 4.030 inches so that the adapter plate 28 can be fastened by screws to the drywall 14 above and below wall cutout 18 in FIG. 2.

A pair of cylindrical sleeves or bosses 39 are fixed next to the open ended slots 36' in the adapter plate 28. The bosses 39 are, e.g., 0.500 inch high and spaced 3.300 inches apart on the adapter plate 28. Accordingly, the cover 22 can be fastened directly to the adapter plate 28 by inserting screws through the two openings in the cover 22 (see FIG. 5), and threading the screws into the bosses 39 on the plate 28. The bosses 39 also prevent the screws from coming into contact with any fiber in the vicinity of the screws. The adapter plate 28 is also configured to accept two 40 mm long splice sleeves, and to allow a slack length of fiber (e.g., 900 μm O.D.) wound on the spool 26 to exit from a top or a bottom edge of the cover 22 when the cover is fixed to the adapter plate 28.

FIG. 5A is a view of the rectangular cover 22 as seen from the front, and FIG. 5B shows the cover 22 from the rear. The cover 22 is also made of a PC/ABS blend or equivalent RoHS compliant material. Two vertically aligned openings 50, 52 are formed through the front of the cover 22, wherein the openings 50, 52 are spaced, e.g., 3.300 inches apart from one another. When the cover 22 is placed over either one of the adapter plates 20, 28, the openings 50, 52 will therefore coincide with the slots 38 formed in the adapter plate 20, or with the bosses 39 on the adapter plate 28.

The cover 22 can therefore be fastened directly to the utility box 16 by aligning the cover openings 50, 52 with the slots 38 in the adapter plate 20 as in FIG. 1, inserting screws through the openings in the cover and the slots in the adapter plate 20, and threading the screws into the utility box 16. In the absence of the utility box, the cover 22 can be fastened to the adapter plate 28 by aligning the cover openings 50, 52 with the bosses 39 on the adapter plate 28 as in FIG. 2, inserting screws through the cover openings, and threading the screws into the bosses 39 on the adapter plate 28.

Cover 22 has a lip 23 that projects from the rear side about the perimeter of the cover. Cutouts 23a are formed in the lip 23 at the top of the of the cover 22, and cutouts 23b are also formed in the lip at the bottom of the cover. The cutouts 23a, 23b are dimensioned to provide safe clearance for a fiber or jumper cable that is adhered to the outside surface of the drywall 14, to pass to and from the module 10 or 12 after the module is installed behind the drywall 14 and the cover 22 is fastened over the opening 18 in the drywall, as explained below.

As seen in FIG. 5B, two cylindrical sleeves or bosses 54, 56 are formed on the rear of the cover 22, coaxially with the openings 50, 52. The bosses project a sufficient distance from the rear surface of the cover 22 so that they confront either one of the adapter plates 20, 28 when the plate is fastened to the drywall 14 and the cover 22 is placed over the plate as in FIG. 1 or in FIG. 2. The bosses 54, 56 therefore prevent the cover 22 from deforming when screws inserted through the openings 50, 52 are tightened to attach the cover 22 to the utility box 16 as in FIG. 1, or to the adapter plate 28 as in FIG. 2. As shown in FIG. 5A, the openings 50, 52 in the front of the cover 22 are preferably chamfered, and knockouts are formed at the bottom of each opening.

The rear of the cover 22 also has a number of retainers 58 arrayed over the rear surface of the cover, for managing and storing a slack length of a fiber jumper cable, after the jumper cable is connected between the module 10 or 12 and an ONT or other optical device at the premises. As mentioned earlier and shown in FIG. 5B, a pair of tabs 59a, 59b also project from the rear of the cover 22, so that the cover can be attached directly to the adapter plate 20 by snapping the tabs 59a, 59b of the cover into the keyed slots 30, 32 in the adapter plate.

Figure 6A:
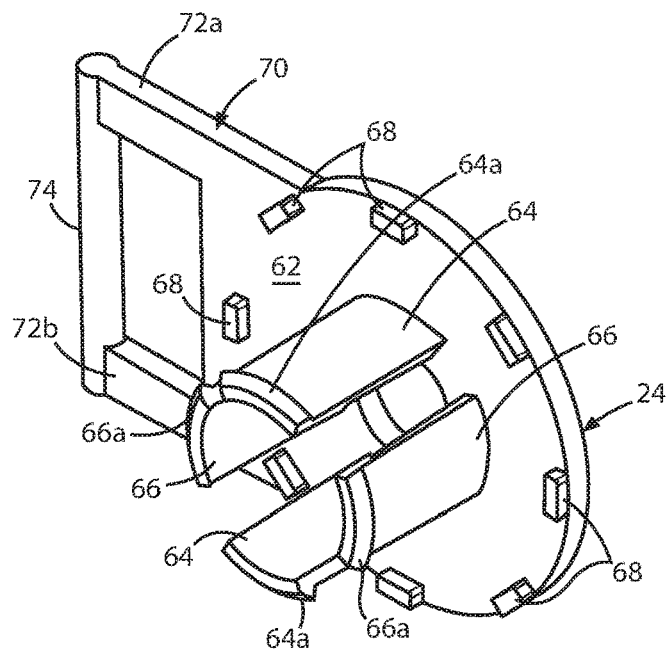
FIG. 6A is a view of a spool plate showing pairs of spool retaining fingers extending from a base of the spool plate, and a hinge pin according to the invention.
Figure 6B:
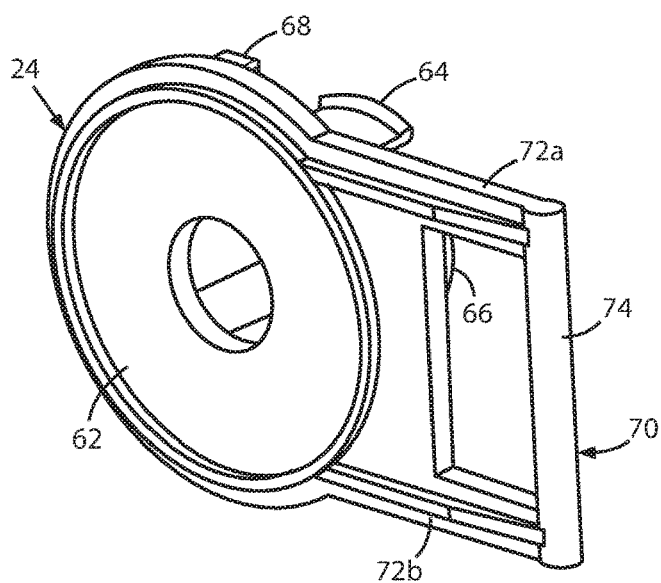
FIG. 6B is a view of the spool plate in FIG. 6A as seen from the opposite side of the base.

FIG. 6A is view of the spool plate 24 in FIG. 1, as seen from a front side of the plate 24 on which the spool 26 (see FIGS. 7A & 7B) is mounted for rotation. FIG. 6B shows the spool plate 24 from the opposite side. The entire spool 24 can be made, for example, of polypropylene copolymer or an equivalent material that is RoHS compliant.

The spool plate 24 is formed with a partly circular base 62 having a diameter of, e.g., 1.668 inches. A first pair of spool retaining fingers 64 and a second pair of spool retaining fingers 66 all rise from the base 62 in an equi-circumferentially spaced array, as seen in FIG. 6A. The first pair of retaining fingers 64 reach a height of, e.g., 0.727 inch above the base 62, and the fingers 64 are diametrically opposed to one another. The second pair of spool retaining fingers 66 rise to a lower height of, e.g., 0.659 inch above the base 62, and the fingers 66 are also diametrically opposite one another.

Each one of the spool retaining fingers 64 has a lip 64a that projects radially outward from the top of the finger, and each of the retaining fingers 66 also has a radially outwardly projecting lip 66a at the top of the finger. As detailed below with respect to the spool 26, the lips 64a and 66a on the retaining fingers cooperate to capture the inner circumference of an annular disk inside the hub of the spool, so that the spool can rotate smoothly about the retaining fingers 64, 66 when the spool hub is centered over the retaining fingers and urged a certain distance toward the base 62 of the spool plate.

When the bottom of the hub of the spool 26 is lowered farther toward the base 62 on the retaining fingers 64, 66, the lips 66a on the shorter pair of retaining fingers 66 clear the inner circumference of the annular disk inside the hub, and the lips 66a diverge radially outward and over the inner circumference of the disk so that the spool 26 is prevented from moving upward on the retaining fingers. Also, the base 62 of the spool plate 24 has an array of eight tabs or bosses 68 that rise up from the base in a circular array, coaxially about the retaining fingers 64, 66. As noted below, the bosses 68 will align with and enter a set of corresponding cutouts in the bottom of the spool hub so as to lock the spool 28 from rotation about the retaining fingers.

Figure 7A:
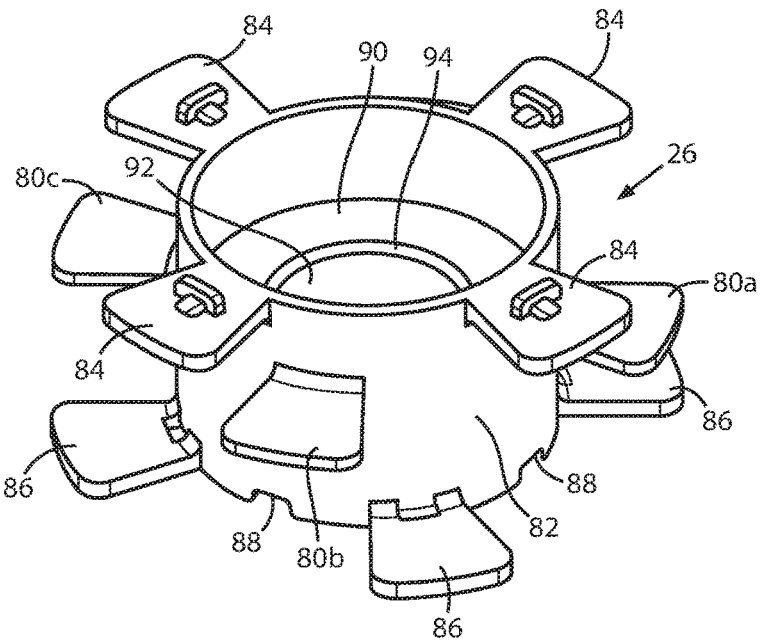
FIG. 7A is a view of a first version of a fiber supply spool for use in the inventive module.
Figure 7B:
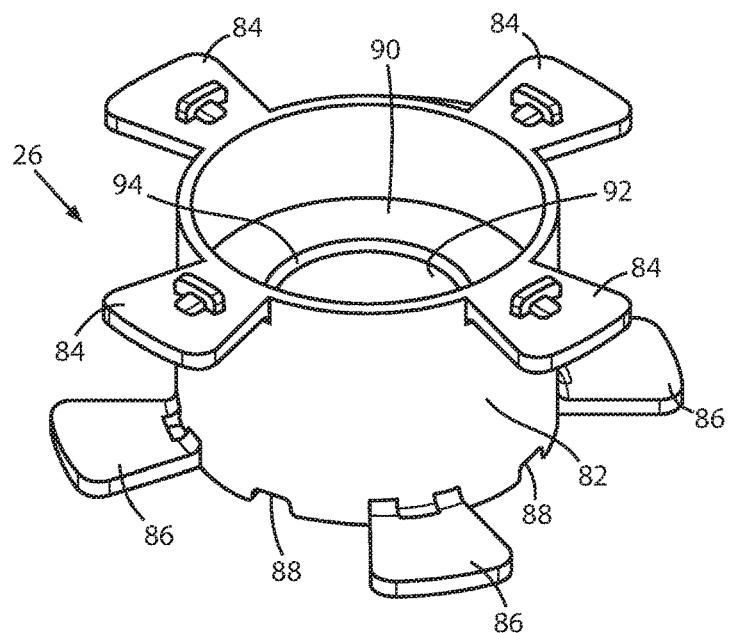
FIG. 7B is a view of a second version of a fiber supply spool for use in the inventive module.

The spool plate 24 also has a hinge pin portion 70 appended to the base 62. The hinge portion 70 includes two parallel arms 72a, 72b that extend from and are coplanar with the base 62, and a hinge pin 74 supported between the distal ends of the arms 72a, 72b. As shown in FIG. 1, the spool plate 24 can be attached to the adapter plate 20 for swinging movement by urging the hinge pin 74 into either one of the hinge knuckles 50a, 50b of the two hinge mounts 44a, 44b that are formed on the plate 20. And as shown in FIG. 2, the spool plate 24 can also be attached to the adapter plate 28 for swinging movement by urging the hinge pin 74 into either one of the hinge knuckles 50a', 50b' of the two hinge mounts 44a', 44b' formed on the plate 28, FIG. 7A is an enlarged view of the spool 26 in FIGS. 1 and 2. FIG. 7B is an enlarged view of a different version of the spool 26, wherein an intermediate set of four flat fiber retaining ears 80 that extend radially outward every 90 degrees from a hollow cylindrical hub 82 of the spool 26 in FIG. 7A, are eliminated.

Figure 8:
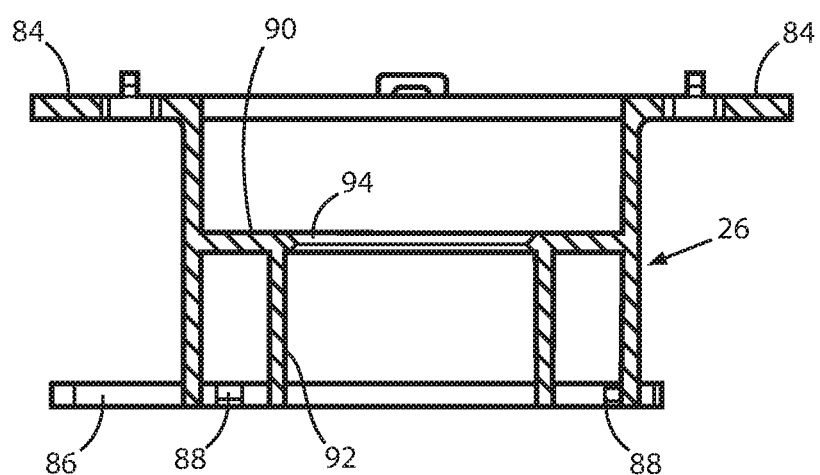
FIG. 8 is a cross-sectional view of the spool in FIG. 7B.

FIG. 8 is a cross-sectional view of the spool 26 in FIG. 7B in a plane that contains the axis of the spool hub 82

In the two versions of the spool 26 shown in FIGS. 7A and 7B, a first set of four flat fiber retaining ears 84 extend radially outward every 90 degrees from the top axial end of the spool hub 82, and a second set of four flat fiber retaining ears 86 also extend radially outward every 90 degrees from the bottom axial end of the hub 82 In the version in FIG. 7A, the first and the intermediate sets of retaining ears 84, 80 form a first winding section on an upper portion of the spool hub 82, and the second and the intermediate sets of retaining ears 86, 80 define a second winding section on a lower portion of the hub 82.

For example, the spool 26 in FIG. 7A can store a length of 900 μm O.D. buffered fiber in the second winding section on the lower portion of the hub 82, which fiber will be payed out for routing from the module 10 or 12 to a network terminal near an entry point of the premises. The same 900 μm fiber may remain unjacketed, or transition through a length of furcation tubing to a 2.0 mm or 3.0 mm O.D. jacketed fiber, to be stored in the first winding section on the upper portion of the spool 26 in FIG. 7A. The fiber in the first winding section will be connected to the ONT or other optical device at the premises without a need for the connector adapter 27. A strain relief tab may be added to two of the intermediate retaining ears 80 of the spool 26 to restrain the furcation tubing at the fiber transition point.

As mentioned, the spool hub 82 also has eight recesses or cutouts 88 formed in the bottom of the hub wall. The cutouts 88 are equi-angularly spaced from one another and are dimensioned to align with and receive the eight bosses 68 on the base 62 of the spool plate 24. Thus, the spool 26 can be locked from rotation about the retaining fingers 64, 66 by lowering the spool hub 82 to a position where the bosses 68 on the base 62 of the spool plate enter the cutouts 88 in the bottom of the hub.

Also, as noted above, the spool 26 contains a flat annular support disk 90, the outer circumference of which is joined coaxially to the inner circumference of the spool hub 82, at a position approximately midway between the top and the bottom axial ends of the spool hub 82. A cylindrical collar 92 is joined at its upper circumference to the inner circumference of the support disk 90, and a rim 94 projects radially inward from the inner circumference of the support disk 90. The lower circumference of the collar 92 is commensurate with the bottom end of the spool hub 82.

Installation Procedure

A rectangular opening approximately 3.75 by 2.25 inches is cut through the drywall 14 inside the user premises, near an ONT or other optical device to be linked to the user's fiber optic network. The size of the hole is just large enough to accept the spool 26 and, optionally, one SCA to SCA adapter or one 40 mm fiber optic fusion splice sleeve. Depending on whether or not the utility box 16 will be used, the corresponding adapter plate 20 or 28 is then fastened to the drywall 14 over the rectangular opening using two drywall screws, with the hinge mounts 44a, 44b (or 44a', 44b') on the adapter plate facing away from the drywall.

The spool 26 is mounted for rotation on the spool plate 24, and the spool plate 24 is fastened to the adapter plate 20 (or 28) by snapping the hinge pin 74 on the spool plate into either the left or the right hinge knuckle 44a, 44b (or 44a', 44b') on the adapter plate, depending on a desired orientation of the spool 26 when the fiber supplied on the spool will be payed out for routing at the premises.

If the spool 26 in FIG. 7A is used, a first stretch of a continuous length of a buffered optical fiber can be supplied in the second winding section of the spool, and a second stretch of the fiber can be wound in the first winding section of the spool. The first stretch of fiber may consist of a length of unjacketed 900 µm O.D. buffered fiber that will be routed between the module 10 or 12, and a network terminal near an entry point at the premises. The second stretch of fiber may remain unjacketed, or have a protective jacket with an O.D. of, e.g., 2.0 or 3.0 mm, wherein the length of the second stretch of fiber is sufficient to extend between the module 10 or 12 and the ONT or other optical device at the premises.

After the fiber is payed out from the first winding section, the spool 26 is ready to be stored behind the drywall 14. The spool plate 24 is swung to a position perpendicular to the drywall so that the plate and the mounted spool passes easily through the rectangular opening in the drywall.

Next, the two screws fastening the adapter plate 20 (or 28) over the rectangular opening in the drywall 14 are loosened and withdrawn, and the adapter plate is reoriented 180 degrees about its long axis. If the spool 26 has the first and second winding sections as in FIG. 7A, enough jacketed fiber is unwound from the first winding section to reach the ONT or other optical device at the premises.

If the spool 26 has only one winding section or layer as in FIG. 7B, then an SCA or equivalent connector adapter 27 is mounted in the frame 46 on the adapter plate 20 or 28 so that a lower end of the adapter is easily accessible between the spool 26 and the adapter plate for connection to an outside jumper cable. An inside end of the fiber that remains in the winding section after being payed out for routing at the premises, is then connected to the upper end of the adapter 27. The connector adapter 27 is preferably supported in the frame 48 on the adapter plate at an angle of approximately 20 degrees from the vertical, so as to provide the user with easy access to the adapter 27 when removing the cover 22 after the installation.

The assembled module 10 or 12 is inserted through the rectangular opening 18 in the drywall 14, and the adapter plate is again fastened to the drywall. Once the screws fastening the adapter plate to the drywall are tightened, the cover 22 or a standard utility box blank plate is fastened with screws to the utility box 16 or to the adapter plate 28.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the scope of the following claims.

We claim:

1. A module for storing a length of optical fiber at user premises, comprising:

a fiber supply spool including a hollow cylindrical hub, a first set of fiber retaining ears extending radially outward from a top axial end of the hub, and a second set of fiber retaining ears extending radially outward from a bottom axial end of the hub, the sets of retaining ears forming at least one winding section on the spool for storing a length of optical fiber for routing at the premises;

a spool plate having a substantially flat base, and a number of spool retaining fingers extending upward from the base for engaging the hub of the fiber supply spool, wherein the spool is mounted for rotation about the retaining fingers when the spool hub is centered over the retaining fingers and urged a certain distance toward the base of the spool plate;

the spool plate also has a hinge pin portion including two arms that extend from the base, and a hinge pin supported between distal ends of the arms; and an elongated adapter plate formed and arranged for fastening to a drywall at the premises, the adapter plate including at least one hinge mount having a knuckle for seating the hinge pin on the hinge portion of the spool plate, so that the spool plate and the spool mounted thereon are attached for swiveling movement with respect to the adapter plate;

wherein the spool plate and the spool mounted thereon can swivel on the adapter plate between a first position at which an optical fiber supplied on the spool is unwound from the spool for routing over a desired path at the premises, and a second position at which the spool plate and the spool are passed through an opening of certain dimensions in a drywall at the premises and the adapter plate is fastened to the drywall, so that the spool is stored behind the drywall with a length of fiber remaining on the spool after the fiber is routed the premises.

2. A module according to claim 1, wherein the arms that extend from the base of the spool plate are coplanar with the base.

3. A module according to claim 2, wherein the arms are parallel to one another.

4. A module according to claim 1, wherein the adapter plate has an adapter mounting frame for securing a connector adapter.

5. A module according to claim 4, including a cover dimensioned and arranged to cover the opening in the drywall after the spool is stored behind the drywall, and the adapter mounting frame is formed to secure the connector adapter at an angle of approximately 20 degrees from the vertical to provide a user with access to one end of the adapter when the cover is removed.

6. A module according to claim 5, wherein the cover has a number of retainers arrayed over a rear surface of the cover for managing and storing a slack length of a fiber jumper after the jumper is connected between the module and an optical device at the premises.

7. A module according to claim 5, wherein the cover has tabs that project from a rear surface of the cover to engage corresponding slots in the adapter plate, so that the cover can be retained over the opening in the drywall when the adapter plate is fastened to the drywall.

8. A module according to claim 5, wherein the cover has a lip that projects from a rear side of the cover, and cutouts are formed in the lip wherein the cutouts are dimensioned to provide clearance for a fiber or a fiber jumper that is routed along the outside surface of the drywall, to pass to and from the module after the module is installed behind the drywall and the cover is fastened over the opening in the drywall.

9. A module according to claim 1, wherein the adapter plate has two hinge mounts formed along the length of the adapter plate, and at either side of the adapter plate.

10. A module according to claim 1, wherein the adapter plate has a splice holder formed along the length of the adapter plate.

11. A module according to claim 1, wherein the spool includes an annular support disk the outer circumference of which is joined coaxially to the inner circumference of the spool hub, a cylindrical collar joined at its upper circumference to the inner circumference of the support disk, and a rim that projects radially inward from the inner circumference of the support disk.

12. A module according to claim 11, wherein the spool retaining fingers include a first and a second pair of retaining fingers, and each pair of retaining fingers are diametrically opposed to one another.

13. A module according to claim 12, wherein the first pair of retaining fingers rise a certain height above the base of the spool plate, the second pair of retaining fingers rise to a height that is lower than that of the first pair of retaining fingers, and each of the retaining fingers has a radially outward projecting lip at the top of the finger wherein the lips cooperate to capture the inner circumference of the annular disk inside the spool hub, so that the spool rotates smoothly about the retaining fingers when the spool hub is lowered over the retaining fingers by a certain distance toward the base of the spool plate.

14. A module according to claim 13, wherein the base of the spool plate has a number of equi-angularly spaced bosses arrayed coaxially about the retaining fingers, and the hub of the spool has a corresponding number of cutouts formed in the bottom of the hub, so that the spool is locked from rotation about the retaining fingers when the hub is lowered to a locked position at which the bosses on the base of the spool plate enter the cutouts in the hub.

15. A module according to claim 14, wherein the lips at the top of the second pair of retaining fingers diverge radially outward and over the inner circumference of the annular support disk inside the hub of the spool when the hub is at the locked position, so that the spool is prevented from upward movement on the retaining fingers.

* * * * *